United States Patent
Liberg et al.

(10) Patent No.: US 9,622,240 B2
(45) Date of Patent: Apr. 11, 2017

(54) METHOD AND ARRANGEMENT FOR TRANSMISSIONS IN VAMOS CAPABLE WIRELESS COMMUNICATION SYSTEMS

(75) Inventors: Olof Liberg, Stockholm (SE); Mårten Sundberg, Stockholm (SE); Karin Wahlqvist, Täby (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 802 days.

(21) Appl. No.: 13/202,989

(22) PCT Filed: Jul. 8, 2011

(86) PCT No.: PCT/SE2011/050934
§ 371 (c)(1),
(2), (4) Date: Aug. 24, 2011

(87) PCT Pub. No.: WO2012/060762
PCT Pub. Date: May 10, 2012

(65) Prior Publication Data
US 2012/0113963 A1    May 10, 2012

Related U.S. Application Data

(60) Provisional application No. 61/410,571, filed on Nov. 5, 2010.

(51) Int. Cl.
*H04W 72/04*    (2009.01)
(52) U.S. Cl.
CPC .............. *H04W 72/0446* (2013.01)
(58) Field of Classification Search
USPC ....................................................... 370/337
See application file for complete search history.

(56) References Cited

U.S. PATENT DOCUMENTS

| | | | | |
|---|---|---|---|---|
| 9,504,046 | B2* | 11/2016 | Yu ................. | H04W 72/082 |
| 2011/0044299 | A1* | 2/2011 | Spencer et al. ................ | 370/336 |
| 2011/0205947 | A1* | 8/2011 | Xin et al. ...................... | 370/311 |
| 2011/0312362 | A1* | 12/2011 | Lee et al. ...................... | 455/509 |
| 2012/0113878 | A1* | 5/2012 | Yu et al. ...................... | 370/311 |

(Continued)

OTHER PUBLICATIONS

Huawei Technologies Co., Ltd., "DTX performance of SACCH for VAMON", 3GPP TSG GERAN #41, St. Julians, Malta, Feb. 16, 2009, XP-002566226.

(Continued)

*Primary Examiner* — Steve Young
(74) *Attorney, Agent, or Firm* — Patents on Demand P.A.; Brian K. Buchheit; Scott M. Garrett

(57) ABSTRACT

A method for transmitting information from a radio base station node to a first mobile station and a second mobile station is disclosed herein. The first and second mobile stations are paired on and share a same carrier frequency, TDMA frame, and time slot in a wireless communication system. Further, the first and second mobile stations are allocated on a first and second VAMOS sub-channel, respectively. The method includes transmitting a GMSK modulated SACCH burst of a SACCH block in a predetermined time slot and TDMA frame on one of the first and second VAMOS sub-channel. The method further includes simultaneously muting the other of the first and second VAMOS sub-channels in the predetermined time slot and TDMA frame.

11 Claims, 7 Drawing Sheets

(56) References Cited

U.S. PATENT DOCUMENTS

2012/0155356 A1* 6/2012 Lei et al. .................. 370/311
2012/0182913 A1* 7/2012 Kreuzer ..................... 370/311
2013/0028202 A1* 1/2013 Hofmann ................... 370/329

OTHER PUBLICATIONS

Research in Motion et al., "Introduction of DTX-based repeated SACCH for MUROS", 3GPP TSG-GERAN Meeting #46, Jeju, South Korea, May 17, 2010, GP-101008.

Huawei Technologies Co., Ltd., "System Level Evaluation of Repeated SACCH and Shifted SACCH in VAMOS", 3GPP TSG GERAN #44, Sophia Antipolis, France, Nov. 16, 2009, GP091944.

Marvell Switzerland, "Shifted SACCH", 3GPP TSG GERAN #44, Sophia Antipolis, France, Nov. 16, 2009, GP-092025.

3rd Generation Partnership Project. "Coexistence of DARP Phase I Handsets with VAMOS." 3GPP TSG GERAN#47, GP-101346, Kunming, P.R. China, Aug. 30-Sep. 3, 2010.

3rd Generation Partnership Prpoject. "On Further Observations of Legacy DARP Phase I Handsets with VAMOS." 3GPP TSG GERAN #47, TDoc GP-101547, Kunming, P.R. China, Aug. 30-Sep. 3, 2010.

\* cited by examiner

METHOD AND ARRANGEMENT FOR TRANSMISSIONS IN VAMOS CAPABLE WIRELESS COMMUNICATION SYSTEMS

TECHNICAL FIELD

The present disclosure relates to wireless communication systems in general, and specifically to methods and arrangements for improving transmission in such systems utilizing VAMOS functionality.

BACKGROUND

Due to the rapid expansion of GSM (Global System for Mobile Communications) networks, it is becoming more and more critical to effectively utilize the existing limited radio spectrum to support the increasing demand for mobile voice services. This has recently been achieved through the development of the so-called VAMOS (Voice services over Adaptive Multi-user channel on One Slot) feature within the 3GPP standardization framework, GSM has evolved from full rate (FR) where one user occupies one time slot, to half rate (HR) where two users are multiplexed on the same time slot. With VAMOS pairs of users can be multiplexed, or paired, onto two VAMOS subchannels of a single physical radio resource to support up to four users on a single timeslot, as illustrated in FIG. 1. Consequently, by implementing VAMOS it is possible to double the number of users that can be handled by each radio base station transceiver. This enhances the hardware efficiency and increases the spectral utilization of GSM while reducing the footprint of GSM radio base stations.

VAMOS doubles the uplink (UL) speech capacity by allowing a pair of VAMOS-allocated mobiles to share the same carrier frequency and time slot number. The mobiles utilize GMSK (Gaussian Minimum Shift Keying) modulation and the VAMOS solution relies on RBS multi-user detection algorithms to demodulate the two GMSK signals.

In downlink (DL) two VAMOS mobile are served by a single AQPSK (Adaptive Quadrature Phase Shift Keying) modulated carrier, see FIG. 2. The AQPSK modulated signal equals the superposition of two GMSK modulated carriers, separated by a 90 degrees phase shift. According to VAMOS terminology, each carrier is allocated to a VAMOS subchannel. In DL the VAMOS solution typically relies on the capability of each mobile station to suppress the synchronous co-channel interference caused by the paired mobile allocated in the paired VAMOS subchannel.

It has recently been discovered by several different stakeholders that some legacy GSM mobiles are not VAMOS capable in the downlink (DL). Since this problem does not occur with mobiles allocated to a non-VAMOS allocation (using GMSK modulation) it is the inherent co-channel interference present in a VAMOS allocation (using AQPSK modulation) that causes call drops see [1], [2], and [3]. At the same time, VAMOS is heavily dependent on the backwards compatibility with legacy mobiles to get market acceptance Observations has been made that activation of discontinuous transmission (DTX) improves the performance. The explanation is that when one mobile becomes inactive in the DL (no speech activity), the BTS (Base Transceiver Station) will utilize GMSK modulation to transmit the bursts to the active paired mobile, even if the mobiles are in a VAMOS allocation. The conclusion is that it is enough for a legacy mobile allocated in VAMOS mode to occasionally receive GMSK modulated bursts to maintain a call. However, since DTX is a statistical property it is not a reliable solution to this problem. E.g. in situations with high level of background noise or in telephone conferences there could be long call durations without the connection entering DTX mode, i.e. an inactive state.

As the VAMOS solution is heavily dependent on the support of legacy mobiles this discovery has the potential to cause permanent damage to the implementation and reputation of VAMOS.

Consequently, there is a need to provide reliable solutions that prevent legacy mobiles e.g. user equipment from experiencing call drops when paired with a VAMOS capable mobile.

SUMMARY

The present disclosure aims to obviate some of the above-mentioned problems, and to provide improved transmission in a VAMOS capable wireless communication system.

A first aspect of the present disclosure presents a method in a radio base transceiver station node for transmitting information to a first mobile station and a second mobile station paired on and sharing a same carrier frequency, TDMA frame and time slot in a wireless communication system, wherein the mobile stations are allocated on a first and second VAMOS sub-channel respectively. The method includes transmitting a GMSK modulated SACCH burst of a SACCH block in a predetermined time slot and TDMA frame on one of the sub-channels and simultaneously muting the other VAMOS sub-channels in the same predetermined time slot and TDMA frame.

A second aspect of the present disclosure presents an arrangement in a radio base transceiver station node, for transmitting information to a first mobile station and a second mobile station paired on and sharing a same carrier frequency, TDMA frame and time slot in a wireless communication system, wherein the mobile stations are allocated on a first and second VAMOS sub-channel respectively. The arrangement includes a GMSK modulating SACCH unit configured for transmitting a GMSK modulated SACCH burst in a predetermined time slot and TDMA frame on one of the VAMOS sub-channels and a muting unit configured for simultaneously muting the other VAMOS sub-channel on the same predetermined time slot and TDMA frame.

Advantages of the present disclosure include ensuring reliable transmissions to legacy, e.g. non-VAMOS enabled, mobile stations allocated to a VAMOS subchannel.

BRIEF DESCRIPTION OF THE DRAWINGS

The invention, together with further objects and advantages thereof, may best be understood by referring to the following description taken together with the accompanying drawings, in which.

ABBREVIATIONS

Figure 1:
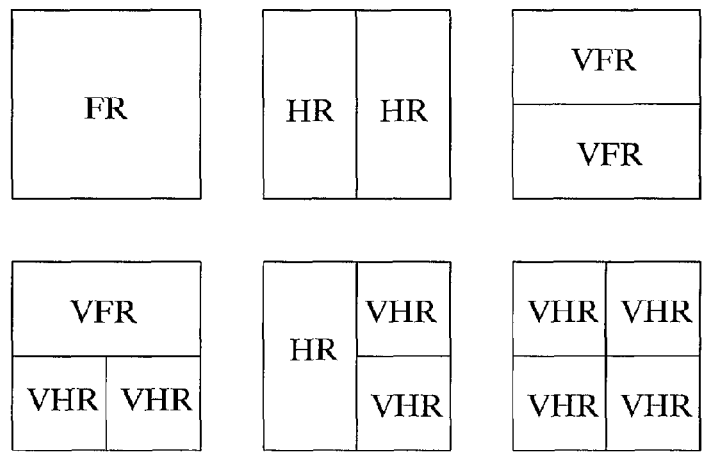
FIG. 1 is an illustration of the capacity evolution of GSM, in terms of users allocated on a single timeslot.
Figure 2:
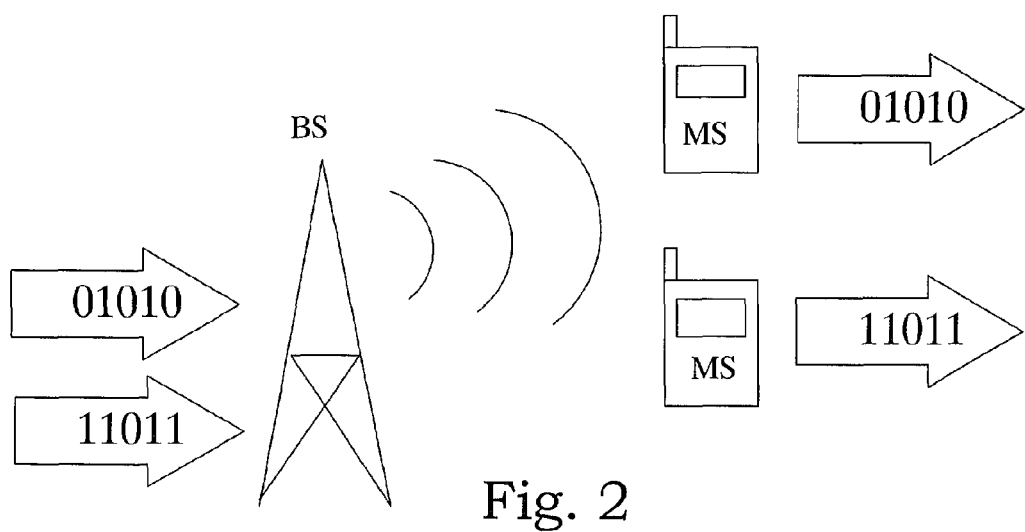
FIG. 2 illustrates the DL concept of VAMOS.

AQPSK Adaptive Quadrature Phase Shift Keying
BTS Base Transciever Station
DARP Downlink Advanced Receiver Performance
DL Downlink
DTX Discontinuous Transmission
GMSK Gaussian Minimum Shift Keying
MS Mobile Station
SACCH Slow Associated Common Control Channel
SAIC Single Antenna Interference Cancellation
SNR Signal to Noise Ratio
SINR Signal to Interference and Noise Ratio
TDMA Time Division Multiple Access
UL Uplink

DETAILED DESCRIPTION

Throughout the drawings, the same reference numbers are used for similar or corresponding elements.

As mentioned previously, VAMOS utilizes the new AQPSK modulation in the DL, see [4]. It can be interpreted as the superposition of two synchronized, and 90 degrees phase shifted, GMSK modulated carriers transmitted in the subchannels of a single time slot. If one VAMOS allocated mobile enters DTX mode the BTS has no information to transmit in its subchannel, and it will utilize GMSK modulation when transmitting information to the paired mobile in the other subchannel.

The inactivity/activity of each of the paired users caused by DTX is however not deterministic and in order to ensure enough GMSK bursts are transmitted to the mobile receiver, a 'forced inactivity' of the paired subchannel is needed. Inactivity in this context refers to not transmitting information.

It has been discovered by the inventors that it is possible to ensure a steady supply of GMSK bursts by adapting and utilizing the reoccurring SACCH (Slow Associated Common Control Channel) signaling channel. The SACCH channel is repeatedly transmitted on both VAMOS subchannels, regardless if the traffic channel is silent or not. Consequently, the SACCH channel is currently always transmitted using AQPSK when two or more VAMOS users are allocated on a time slot. By muting or inactivating one of the sub-channels during that time slot, in a predetermined TDMA frame, it is ensured that the other sub-channel will be provided with a GMSK modulated SACCH burst.

The basic concept of the present disclosure is to utilize the reoccurring SACCH signaling channel to, in a deterministic and predictable behavior, transmit SACCH bursts using GMSK modulation to a VAMOS allocated legacy mobile. In similarity to DTX the transmission of GMSK modulated bursts will help the legacy mobile to overcome the issues presented in reference [1], [2], and [3]. This solution is, in contradiction to DTX, predictable and can guarantee stability of mobile operation. If a legacy mobile is paired with a VAMOS mobile, not suffering from the issues described in [1], [2], and [3], it is sufficient to secure transmission of GMSK modulated SACCH burst in the sub-channel of the legacy mobile. If two legacy mobiles are paired, transmission of GMSK modulated SACCH burst can alternated between the two sub-channels to secure robust operation of both legacy mobiles.

An alternative solution is to inactivate bursts on the traffic channels. This will however cause severe degradation to speech quality if done on a frequent basis, where typically low frame erasure rate levels are targeted for voice services.

Figure 3:
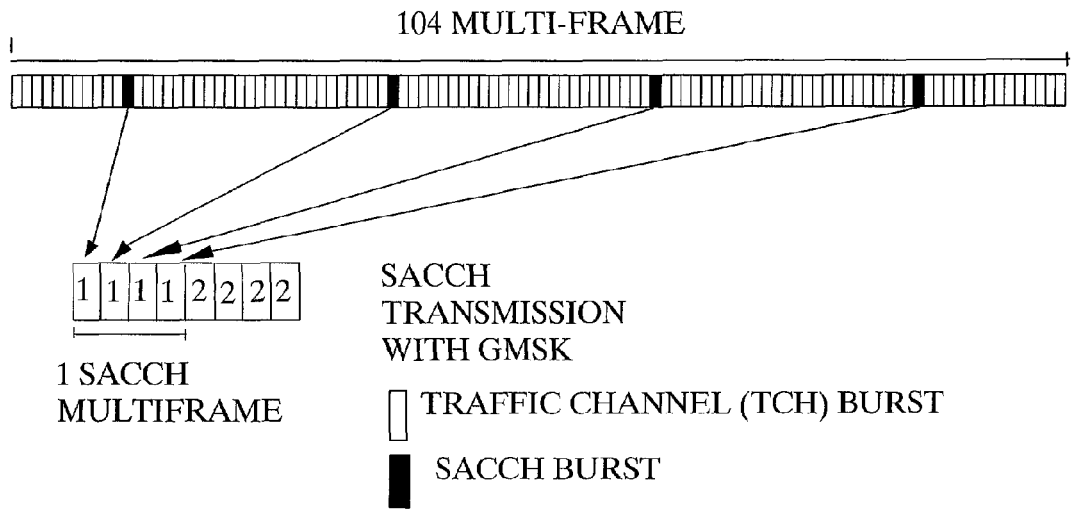
FIG. 3 illustrates SACCH transmission with GMSK.
Figure 4:
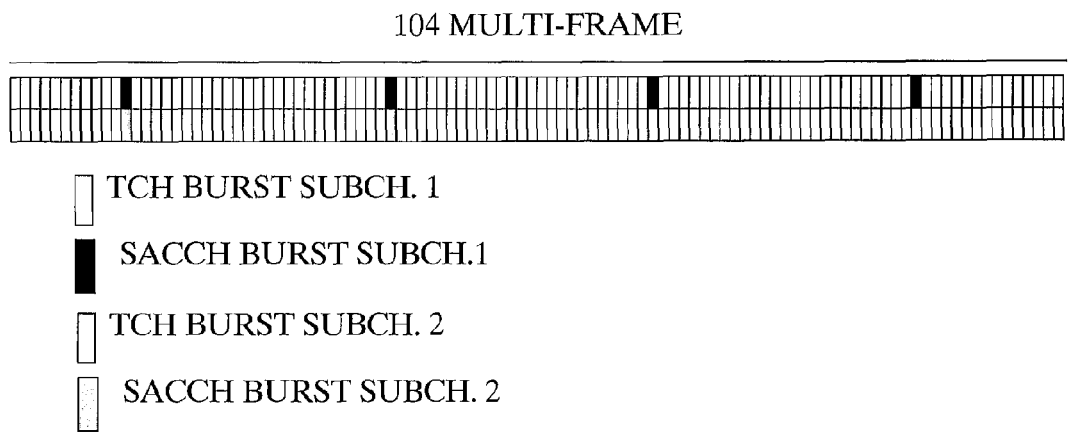
FIG. 4 illustrates SACCH transmission with AQPSK.
Figure 4:
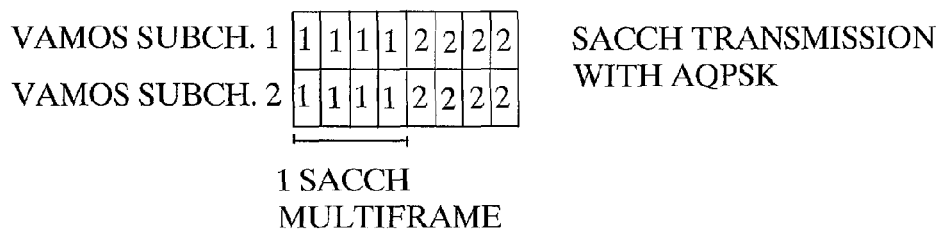

Typically, a SACCH radio block transmitted with once every a multiframe, consisting of 104 TDMA frames transmitted during 480 ms. This is illustrated in FIG. 3 that depicts a distinct TDMA frame time slot in a multiframe, and the GMSK transmission of a SACCH radio block on that time slot, interleaved over four bursts spread over the multiframe. The four SACCH bursts belonging to the single SACCH radio block are illustrated as the black slots in the multiframe structure. In each consecutive multiframe, a new SACCH radioblock is transmitted, as indicated by FIG. 3. For a VAMOS connection, see FIG. 4, the same applies, with the difference that two parallel SACCH radio blocks are transmitted with AQPSK modulation in the two VAMOS subchannels; the first VAMOS subchannel is indicated by black slots, and the second VAMOS subchannel are indicated by grey slots. So in each consecutive multiframe two new parallel SACCH radioblocks are transmitted in the sub-channels.

Figure 5:
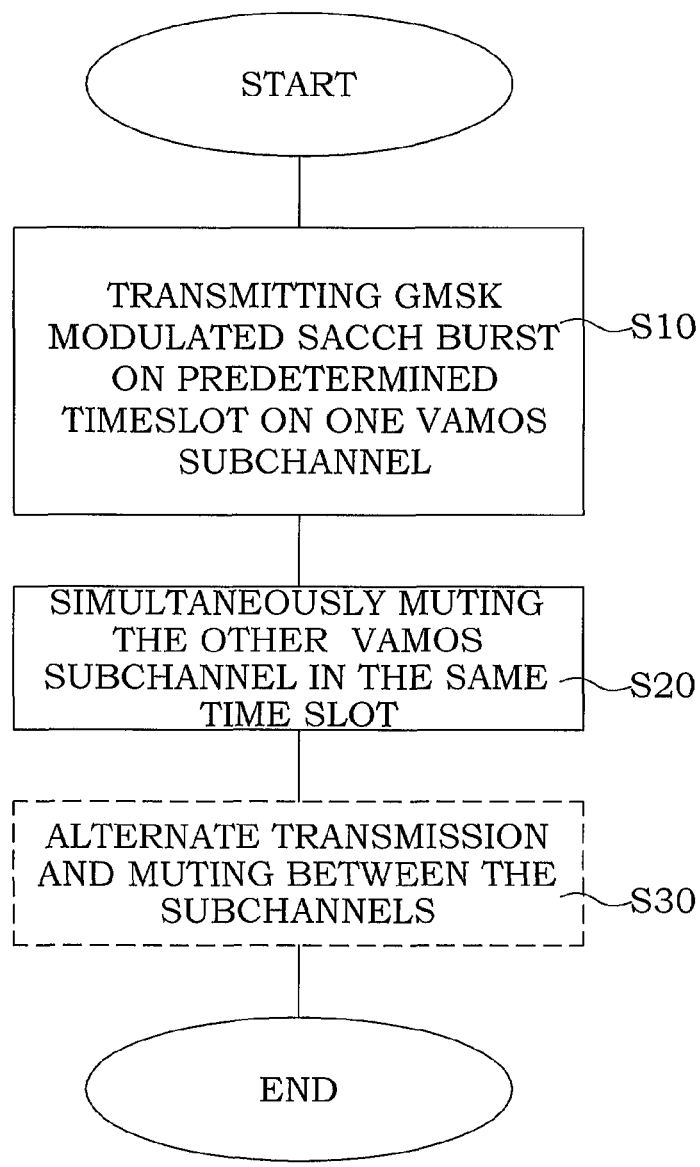
FIG. 5 is a flow diagram of an embodiment of a method according to the present disclosure.

According to a basic embodiment of the present disclosure, as illustrated in FIG. 5, a method of transmitting information from a radio base transceiver station node to a first and a second legacy mobile station node paired on and sharing a same carrier frequency, TDMA frame and time slot number in a wireless communication system, includes transmitting S10 a GMSK modulated SACCH burst of a SACCH radio block in a predetermined times slot and TDMA frame on one of the VAMOS subchannels and simultaneously muting S20 the paired VAMOS subchannel. A regular transmission of an AQPSK modulated SACCH burst on both VAMOS subchannels is thereby replaced by the transmission of GMSK modulated SACCH burst on one VAMOS subchannel and the simultaneously muting, i.e. inactivating, the paired VAMOS subchannel during the same time slot and TDMA frame. Preferably, the GMSK modulated bursts are transmitted in the VAMOS subchannel on which a non-VAMOS capable legacy mobile is allocated.

Figure 6:
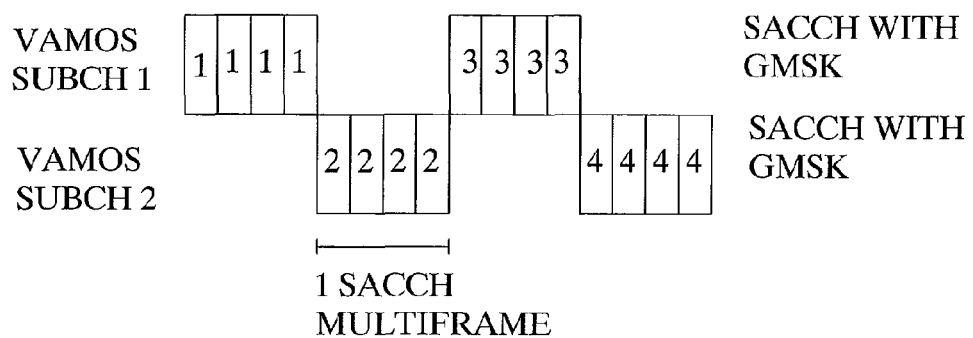
FIG. 6 illustrates an embodiment of the method according to the present disclosure.

According to another embodiment, illustrated in FIG. 6, the combined transmission of a GMSK modulated SACCH burst in a predetermined time slot and TDMA frame on one VAMOS subchannel and the muting of the other VAMOS subchannel during the same timeslot and TDMA frame is performed alternately S30 on a TDMA multiframe basis to achieve alternate transmission of GMSK modulated SACCH radio blocks in both subchannels. In a plainer wording, all bursts of a first SACCH block are transmitted with GMSK modulation in the first VAMOS subchannel, i.e. VAMOS SUBCH1, while the second VAMOS subchannel, i.e. VAMOS SUBCH2, is muted during the same period. Subsequently, in the next time period, e.g. multiframe, VAMOS SUBCH1 is muted, whereas simultaneously all bursts of the second SACCH block are transmitted with GMSK modulation in VAMOS SUBCH 2. The alternating transmission of bursts and muting of the other channel is repeated for a plurality of subsequent multiframes and SACCH blocks. This enables the allocation of two legacy mobiles on a pair of VAMOS sub-channels.

This embodiment guarantees a relatively high frequency of GMSK modulated bursts for the legacy non-VAMOS terminals under a limited time period, as all bursts of at most every other SACCH block are GMSK modulated on at least one of the VAMOS subchannels. The benefit of this embodiment is that it will ensure GMSK transmission to each MS every $26^{th}$ burst in every second SACCH period. The embodiment further secures robust SACCH transmission, with superior throughput in low SNR regions as illustrated by ALT#1 in FIG. 8. by transmitting with GMSK modulation and removing the inherent co-channel interference from the paired subchannel. The update rate of the SACCH will however be negatively affected resulting in a SACCH update once every second multiframe, i.e. every 960 ms.

Each SACCH radioblock is typically interleaved over four bursts spread out during 480 ms in the GSM TDMA frame structure. However, it is equally applicable to any interleaving frequency.

Figure 7:
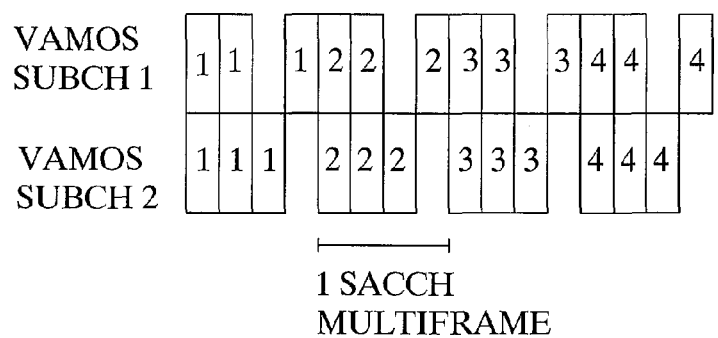
FIG. 7 illustrates another embodiment of the method according to the present disclosure.
Figure 7:
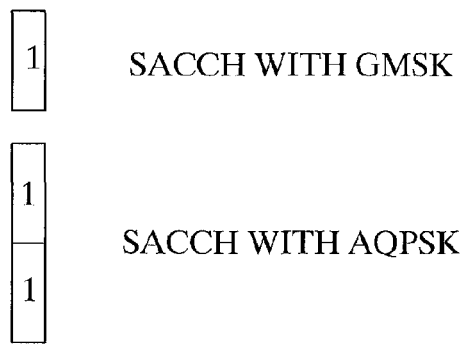

According to further embodiment, with reference to FIG. 7, the process shown in FIG. 6 can be applied to two sub-channels on a SACCH burst by burst basis to achieve alternate S30 transmission of a set of GMSK modulated SACCH bursts in the subchannels. In a plainer wording, only one GMSK modulated SACCH burst for each SACCH block is transmitted on each of the two VAMOS subchannels, while the other VAMOS subchannel is simultaneously muted during the same predetermined burst. This embodiment is equal to inactivate one burst in each SACCH block for the two VAMOS subchannels. This will ensure that the SACCH update rate is maintained while still ensuring that GMSK burst are transmitted in a periodic manner. Again, this enables the allocation of two legacy mobiles on a pair of VAMOS sub-channels, while maintaining the high peak throughput in high SNR regions as illustrated by ALT2 in FIG. 8

This process can be performed for a plurality of subsequent SACCH blocks. In a multiframe, at least one GMSK modulated SACCH burst should to be transmitted on at least one of the VAMOS subchannels. However, it is not necessary to transmit a GMSK modulated SACCH burst on both VAMOS subchannels, if for example a VAMOS capable mobile is allocated on one of the subchannels. The number of burst that should be GMSK modulated could be predetermined or adapted based on some predetermined criteria or parameter, such as e.g. a SNR equivalent for one or both of the subchannels.

Figure 8:
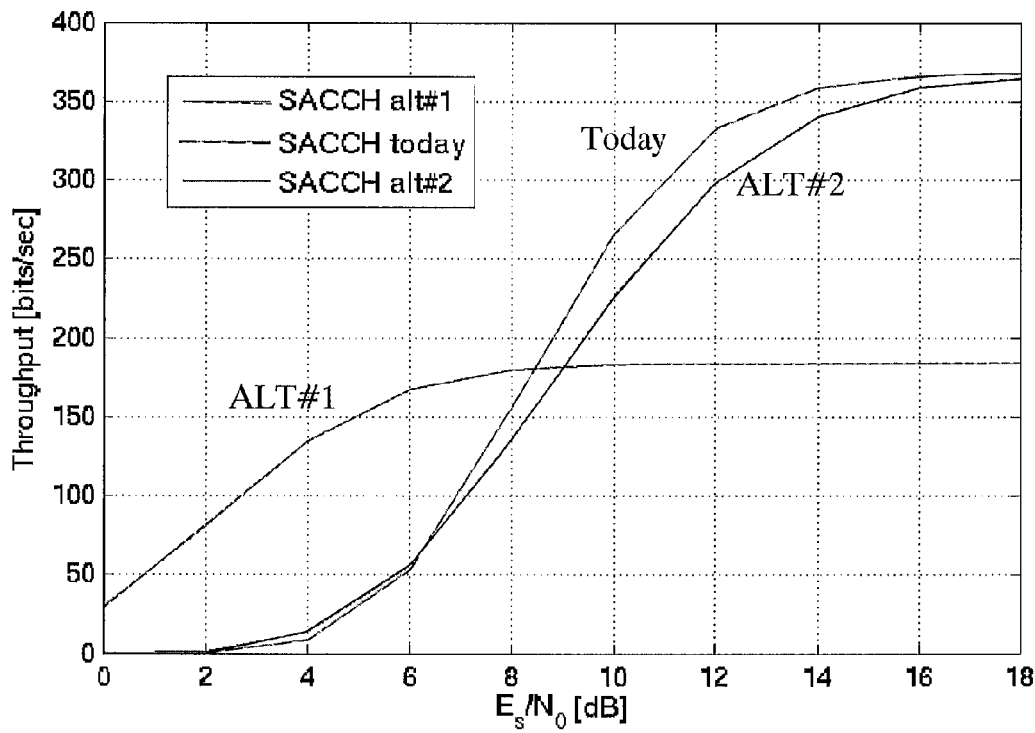
FIG. 8 is a diagram illustrating the throughput versus the SNR for the presently standardized SACCH solution and two embodiments of the present disclosure.

As previously mentioned it can be beneficial to adaptively utilize one or a combination of the previously described embodiments of transmitting GMSK modulated SACCH bursts on one VAMOS subchannel and correspondingly muting the other VAMOS subchannel during the same burst. In FIG. 8 the throughput is as a function of SNR depicted for two embodiments of the present disclosure together with a legacy transmission scheme. The curve labeled SACCH alt#1 corresponds to the above described embodiment where all bursts of every other SACCH block are transmitted alternately on the two VAMOS subchannels and correspondingly muted on the other VAMOS subchannel. The curve labeled SACCH alt#2 corresponds to the above-described embodiment where one GMSK modulated SACCH burst of each SACCH block is transmitted on each VAMOS subchannel and the other channel is correspondingly muted during the GMSK modulated SACCH burst.

It can be seen that there is a clear throughput gain by using SACCH Alternative#1 at low SNR regions due to the robustness of the GMSK modulation. However, due to the reduction in SACCH update rate the peak throughput is reduced. Further, the robustness of the SACCH ensures that even though one burst per SACCH radioblock is inactivated in Alternative#2, there is still a high probability of decoding the SACCH block correctly. While increasing the code rate when inactivating a burst, another burst within the same radioblock will be GMSK modulated when the paired user is inactivated. This almost compensates the increase in code rate and secures a SACCH transmission, with high peak throughput in high SNR regions as illustrated by Alternative#2 in FIG. 8. The maximum loss of Alternative#2 compared to today's scheme is at most around 1 dB.

The two solutions described above can be used by the network adaptively depending on radio environment. Consequently, it is according to a further embodiment, beneficial to adaptively combine the above-mentioned embodiments based on the experienced SNR, or an equivalent measure, in one or both of the VAMOS sub-channels, to achieve a robust operation in low SNR regions and high throughput operation in high SNR regions. Generally, a first number of GMSK bursts are transmitted of the first SACCH block on the first VAMOS subchannel, while the second VAMOS subchannel is muted. In the second SACCH block, a second number of GMSK bursts are alternatively transmitted on both of the two subchannels while the other subchannel is correspondingly muted. Essentially, it is possible to vary the number of GMSK bursts transmitted for each SACCH block on each of the two subchannels, from one SACCH block to the other, either in a predetermined manner, or adaptively as described previously and illustrated in FIG. 9.

Figure 9:
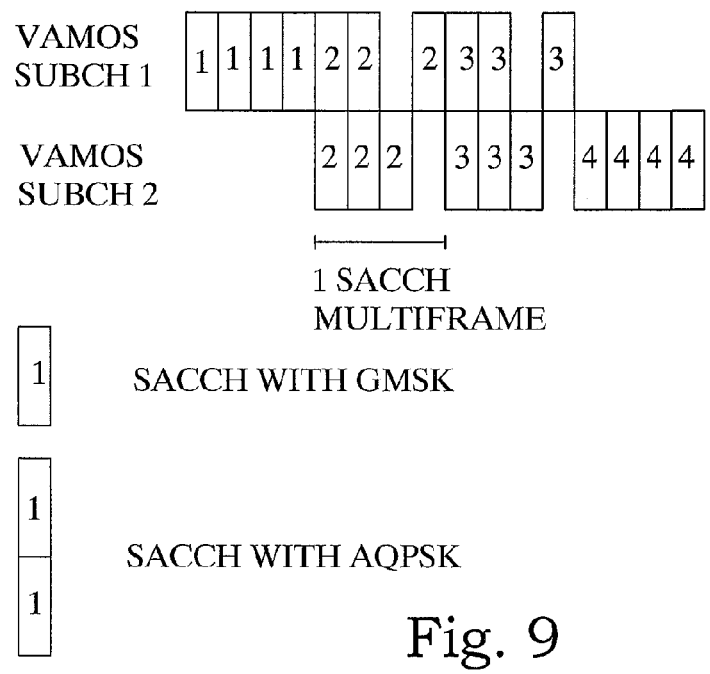
FIG. 9 illustrates a further embodiment of the method according to the present disclosure.
Figure 10:
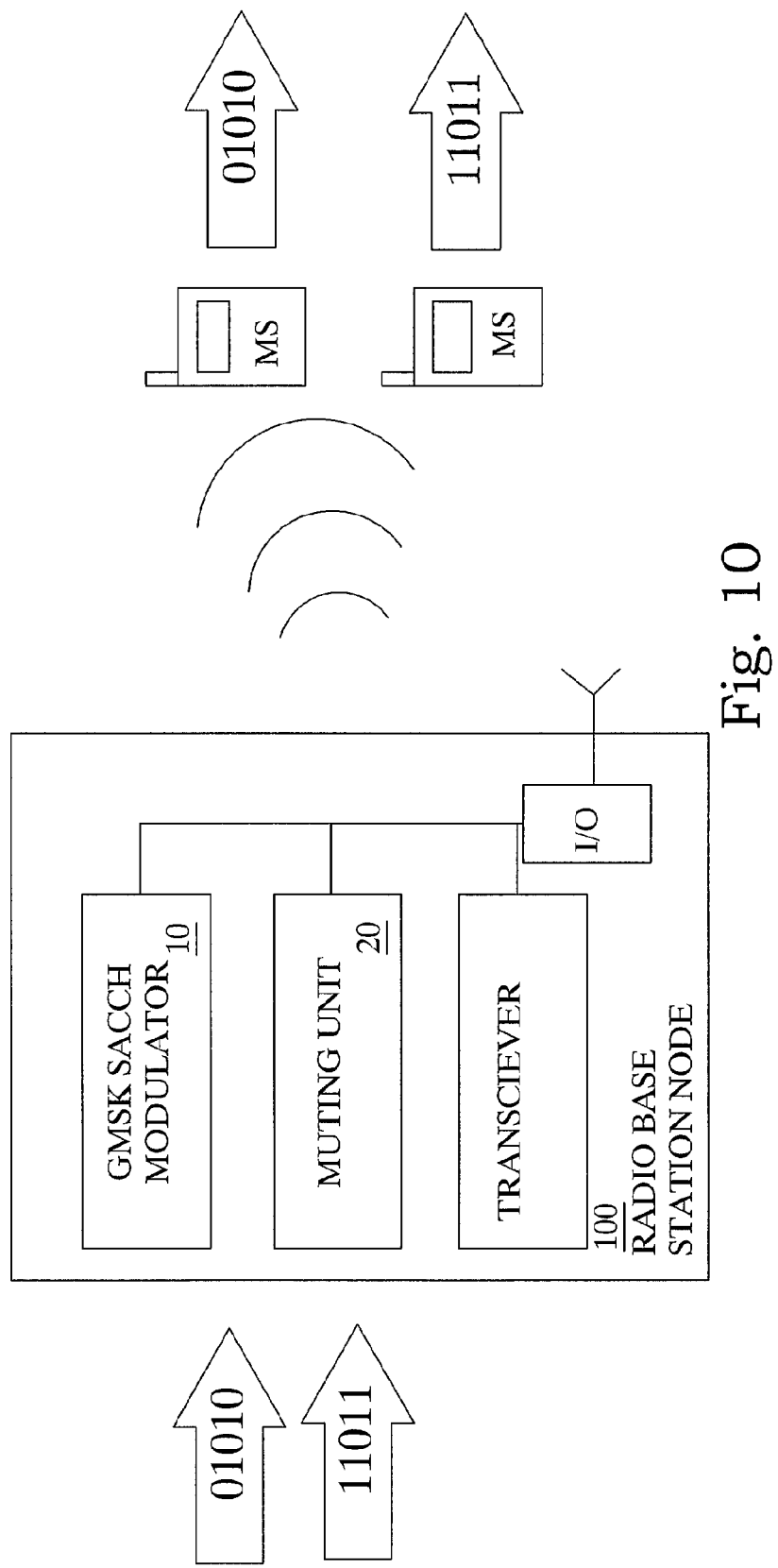
FIG. 10 illustrates an arrangement according to the present disclosure.

With reference to FIG. 9, a further embodiment of a method of the present disclosure is exemplified. The embodiment combines the previously described embodiments to reduce the SACCH rate but still ensuring a substantial number of GMSK bursts every two seconds. In FIG. 10 the SACCH rate is reduced to ¾ but while ensuring six GMSK bursts being transmitted every two seconds. Essentially, all SACCH bursts of a first SACCH block in a first multiframe are GMSK modulated and transmitted on the first VAMOS subchannel, whereas the other VAMOS subchannel is muted during the corresponding time slots. During the subsequent multiframe, the SACCH bursts are AQPSK modulated during all timeslots but one on both subchannels, in the remaining two time slots the SACCH burst is GMSK modulated and transmitted on one of the channels and the other channel is muted during the same time slot and the order is altered in the other of the two time slots. In the subsequent third multiframe, the same procedure is repeated. Finally, in the fourth multiframe, all SACCH bursts on the second subchannel are GMSK modulated, whereas the first subchannel is muted during the corresponding time slots.

In the embodiment of FIG. 9, the bursts for which the other channel is muted correspond to the fourth burst on the first subchannel and the third burst on the second subchannel. This order can however be varied based on some predetermined or adaptive parameter.

With reference to FIG. 10, an embodiment of an arrangement in a radio base transceiver station (BTS) 100 node will be described. The arrangement is configured for transmitting information to a first mobile station and a second mobile station paired on and sharing a same carrier frequency, TDMA frame and time slot in a wireless communication system, wherein the mobile stations are allocated on a first and second VAMOS sub-channel respectively. The arrangement includes a GMSK modulating SACCH unit 10 configured for transmitting a GMSK modulated SACCH burst in a predetermined time slot and TDMA frame on one of the VAMOS sub-channels, and a muting unit 20 configured for muting the other VAMOS subchannel on the same time slot and TDMA frame. In addition, the radio base transceiver station includes all well known functional entities needed in order to receive, process e.g. modulate and transmit signals, both using the traffic channel and the conventional SACCH channel. The transceiver box and the input/output box in FIG. 10 represent these functionalities.

The arrangement is adapted to perform all steps of the described embodiments of the method according to the present disclosure.

The steps, functions, procedures, and/or blocks described above may be implemented in hardware using any conventional technology, such as discrete circuit or integrated circuit technology, including both general-purpose electronic circuitry and application-specific circuitry.

Alternatively, at least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

Figure 11:
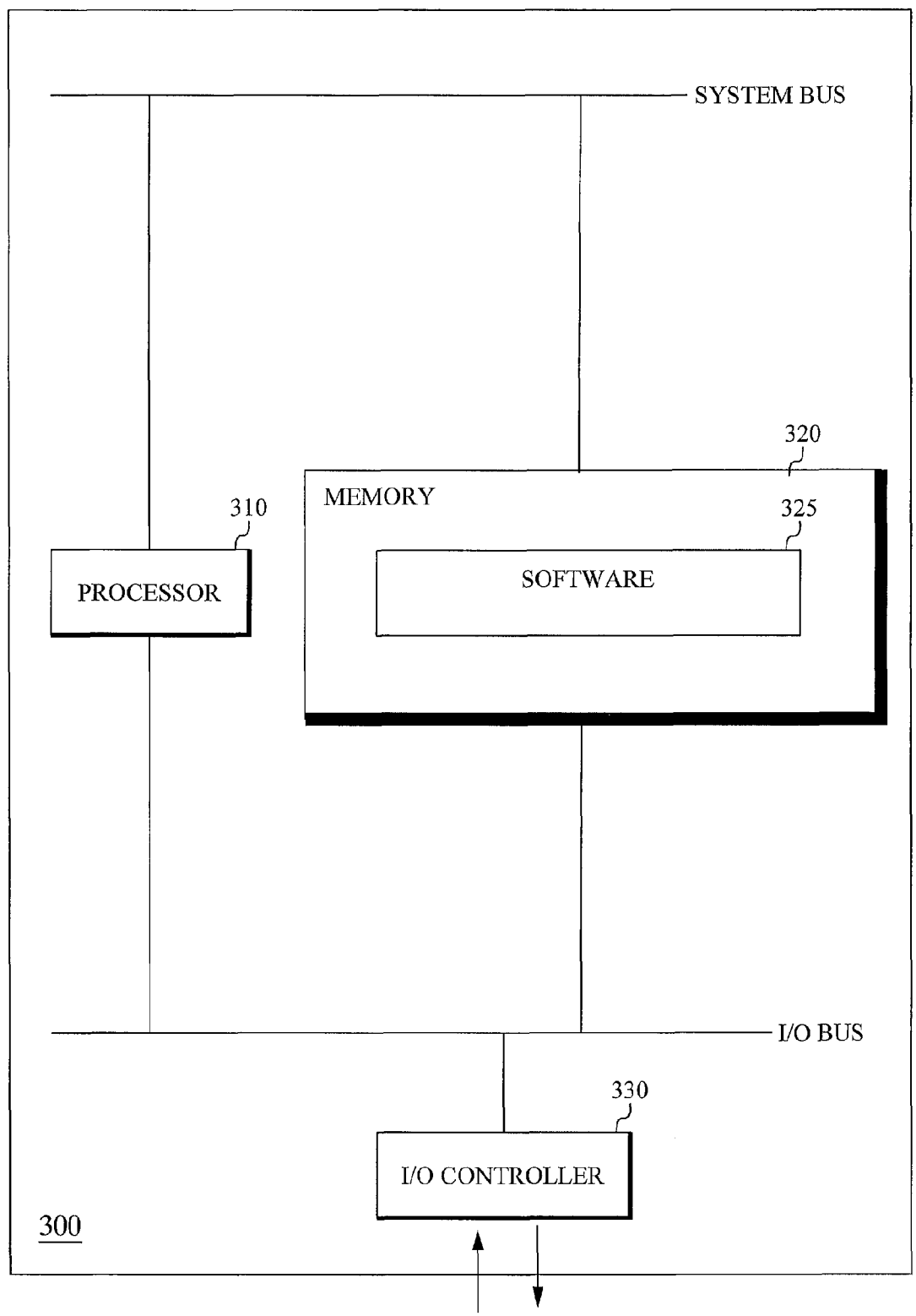
FIG. 11 illustrates a computer implementation according to the present disclosure.

In the following, an example of a computer-implementation will be described with reference to FIG. 11. A computer 300 comprises a processor 310, an operating memory 320, and an input/output unit 330. In this particular example, at least some of the steps, functions, procedures, and/or blocks described above are implemented in software 325, which is loaded into the operating memory 320 for execution by the processor 310. The processor 310 and memory 320 are interconnected to each other via a system bus to enable normal software execution. The I/O unit 330 may be interconnected to the processor 310 and/or the memory 320 via an I/O bus to enable input and/or output of relevant data such as input parameter(s) and/or resulting output parameter(s).

The advantage of this solution is that VAMOS backwards compatibility towards legacy non-VAMOS mobiles is guaranteed by ensuring a minimum number of GMSK burst transmissions for the MS to receive, irrespective of the DTX activity state of the two VAMOS users. In addition, alternative#1 will improve SACCH performance in challenging radio conditions, ensuring VAMOS operation at lower SINR than without this solution.

Further, the two alternatives outlined encompasses different characteristics on the frequency of GMSK burst transmission (in terms of periodicity and transmission interval) that can be used depending on the requirements on GMSK transmission by the receiving MS.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] TSG GERAN, GP-100760 *Coexistence of DARP Phase I handsets with VAMOS*, Huawei Technologies Co Ltd and Vodafone Group Plc
[2] TSG GERAN, GP-101346 *Coexistence of DARP phase I handsets with VAMOS*, Telefon AB LM Ericsson
[3] TSG GERAN, GP-101547 *On Further Observations of Legacy DARP Phase I handsets with VAMOS*, ZTE
[4] 3GPP TS45.004, "3$^{rd}$ Generation Partnership Project; Technical Specification Group GSM/EDGE Radio Access Network; Modulation"

The invention claimed is:

1. A method for transmitting information from a radio base station node to a first mobile station and a second mobile station paired on and sharing a same carrier frequency, Time Division Multiple Access (TDMA) frame, and time slot in a wireless communication system, wherein said first and second mobile stations are allocated on a first and second Voice services over Adaptive Multi-user channel on One Slot (VAMOS) sub-channel, respectively, said method comprising:
   transmitting a Gaussian Minimum Shift Keying (GMSK) modulated Slow Associated Common Control Channel (SACCH) burst of a SACCH block in a predetermined time slot and TDMA frame on one of said first and second VAMOS sub-channels;
   simultaneously muting the SACCH burst in the other of said first and said second VAMOS sub-channels in said predetermined time slot and TDMA frame; and
   performing said transmitting and said simultaneously muting alternately on both of said first and second VAMOS subchannels.

2. The method according to claim 1, further comprising performing said transmitting and said simultaneously muting for a plurality of SACCH blocks of a plurality of subsequent TDMA frames.

3. The method according to claim 1, further comprising performing said transmitting and said simultaneously muting for a plurality of bursts of said SACCH block.

4. The method according to claim 2, further comprising performing said transmitting and said simultaneously muting for at least one burst of every other SACCH block.

5. The method according to claim 2, further comprising performing said transmitting and said simultaneously muting for at least one burst of every SACCH block.

6. The method according to claim 1, further comprising performing said transmitting and said simultaneously muting on one of said first and second VAMOS sub-channels.

7. The method according to claim 1, further comprising performing said transmitting and said simultaneously muting for a first number of bursts in a first SACCH block on one or both of said first and second VAMOS subchannels, and for a second different number of bursts in a second SACCH block on one or both of said first and second VAMOS subchannels.

8. The method according to claim 7, wherein said first number of bursts comprise all bursts of said first SACCH block on one of said first and second VAMOS subchannels, and said second number of bursts comprise a respective at least one burst in said second SACCH block on both of said first and second VAMOS subchannels.

9. The method according to claim 8, further comprising, for a plurality of subsequent SACCH blocks:
  transmitting all bursts of all timeslots of a first SACCH block on said first VAMOS subchannel and muting said second VAMOS subchannel during the corresponding timeslots, and transmitting all but one respective burst of a second SACCH block on both of said first and second VAMOS subchannels; and
  muting the other VAMOS subchannel during a corresponding respective timeslot, and transmitting all bursts of all timeslots of a third SACCH block on said second VAMOS subchannel and muting said first VAMOS subchannel during the corresponding timeslots.

10. The method according to claim 3, further comprising performing said transmitting and said simultaneously muting adaptively in response to a reported signal over noise ratio equivalent for at least one of said first and second VAMOS sub-channels.

11. An apparatus in a radio base station node, for transmitting information to a first mobile station and a second mobile station paired on and sharing a same carrier frequency, Time Division Multiple Access (TDMA) frame, and time slot in a wireless communication system, wherein said first and second mobile stations are allocated on a first and second Voice services over Adaptive Multi-user channel on One Slot (VAMOS) sub-channel respectively, said apparatus comprising:
  a Gaussian Minimum Shift Keying (GMSK) modulating Slow Associated Common Control Channel (SACCH) unit configured to transmit a GMSK modulated SACCH burst in a predetermined time slot and TDMA frame on one of said first and second VAMOS sub-channels; and
  a muting unit configured to simultaneously mute the SACCH burst in the other of said first and said second VAMOS subchannels on the same time slot, wherein the GMSK modulating SACCH unit and the muting unit are configured to transmit the GMSK modulated SACCH burst and to simultaneously mute the SACCH burst alternately on both of the first and second VAMOS subchannels.

* * * * *